Aug. 19, 1947.  M. A. KNIGHT ET AL  2,425,743

ELECTRONIC CONTROL FOR CHARGING CIRCUITS

Filed June 12, 1944

Inventors
Milton A. Knight
and John A. Taylor.

By W Glenn Jones
Attorney

Patented Aug. 19, 1947

2,425,743

UNITED STATES PATENT OFFICE 2,425,743

ELECTRONIC CONTROL FOR CHARGING CIRCUITS

Milton A. Knight, Arlington, Va., and John A. Taylor, Washington, D. C.

Application June 12, 1944, Serial No. 539,948

3 Claims. (Cl. 320—40)

(Granted under the act of March 3, 1883, as amended April 30, 1928; 370 O. G. 757)

This invention relates to a system for controlling the charging of a storage battery from a direct current generator that is not operated at uniform speed, such as a generator driven by the engine of an aircraft or other vehicle.

Among the several objects of this invention are:

To provide a system for the purpose mentioned that does not depend upon the flux from a permanent magnet, nor upon the effect of two coils that oppose each other;

To provide a control system wherein the opening and closing of the charging circuit depend upon the current through a vacuum tube, which is governed by the relative magnitude of the output voltage of the generator and the voltage of the battery.

The means by which these and other objects that will be apparent to those skilled in the art are attained will be understood from the following description when read in connection with the accompanying drawings in which.

Figure 1:
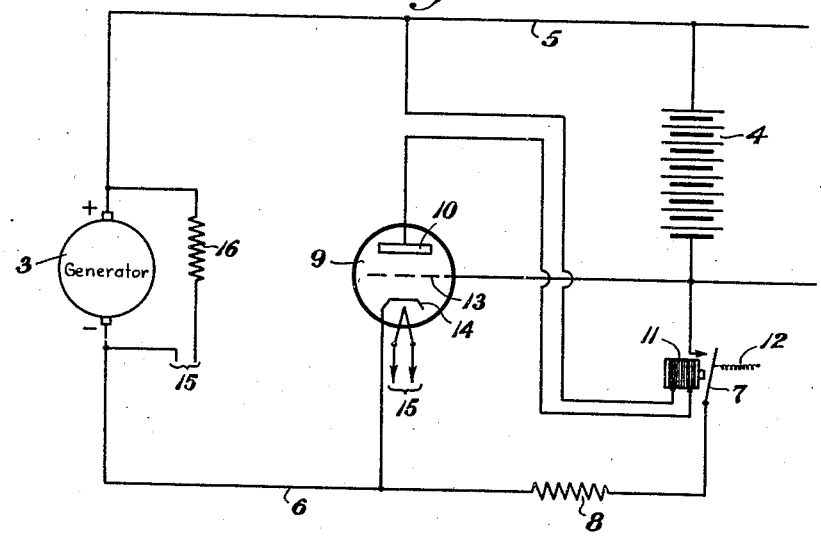
Fig. 1 illustrates our invention as applied to a generator when no other voltage source is available.

It is customary in aircraft and numerous other installations to charge a storage battery from a direct current generator that may be driven by the prime mover of a vehicle in which the system is carried or intermediately by an alternating current motor that operates at a voltage higher than the generator output voltage. Various means are known to close the charging circuit when the output voltage of the generator is greater than the battery voltage and to open that circuit when the generator voltage drops below the battery voltage to prevent discharge of the battery through the generator by a reverse current. All of the known systems heretofore used have been subject to uncertainty of operation for various reasons.

One such device has a movable armature and an iron core wherein a magnetic flux is produced by current flowing through a voltage coil on the magnetic core energized by the voltage of the generator which exerts a pull on the movable armature to overcome a tension and close a circuit permitting current to flow from the generator to the battery. In case of reverse current flow the flux produced by the reverse current flowing through a series coil positioned on the same magnetic core as the said voltage coil produces a flux which bucks the voltage coil flux and in decreasing the total flux existing in the magnetic core, reduces the pull on the armature to a value that allows the tension spring to move the armature away from the magnetic core and opens the circuit between generator and battery, automatically preventing a discharge of the battery through the generator circuit whenever the generator voltage is insufficient to charge properly the associated battery.

In a second such device a magnetic flux derived from a permanent magnet acts on a movable armature and tends to keep the circuit controlling contacts open. The flux of the permanent magnet is decreased or increased by means of voltage and series coils to give operation of the opening and closing of the controlling contacts.

In a third such device control is provided by a relay operating as in the first device and in addition controlling a polarized differential voltage coil operating on the difference in potential between the generator and battery to provide connecting and disconnecting of the generator and the battery circuit in the desired operations.

In a device of the first type the magnetic flux in the magnetic core and movable armature is a function of generator voltage and of line current. In such a relay, with no voltage being generated, if the contacts are closed inadvertently as a result of vibration or by manual means the current flowing through the series coil can produce sufficient flux in the magnetic core and movable armature to hold the circuit closed, since the pull between the armature and magnetic core is produced by total lines of magnetic force existing and is not responsive to direction (polarity) of the lines of force.

In the second such device decreases in the permanent magnetization can be expected from repeated demagnetizing flux of the voltage and series coils and momentary closing due to vibration and shock can also be expected.

Difficulties as outlined for the first and second such devices are also encountered in devices of the third type mentioned.

The present invention provides an electronic control for an electrically operated relay and/or contactor to connect the generator to the battery when the voltage of the generator exceeds battery voltage and to disconnect the generator from the battery when the generator voltage is less than battery voltage. While for purpose of illustration a relay is conventionally shown, it is to be understood that any suitable electrically operated circuit breaking and closing device may be used.

Referring to Fig. 1, the positive terminal of generator 3 is connected to the positive terminal of battery 4 by lead 5. The negative terminal of generator 3 is connected to the negative terminal of battery 4 through lead 6, spring biased circuit closing and breaking member 7 and a resistor 8, the functions of this resistor being subsequently set forth.

Vacuum tube 9 has an anode 10 connected to lead 5 through a relay electromagnet 11 disposed to actuate the member 7 to circuit closing position against the pull of bias spring 12 when the current through tube 9 is sufficiently great. Control grid 13 of tube 9 is connected to a point between the negative terminal of battery 4 and the member 7, while cathode 14 is connected to lead 6. Cathode 14 is heated by current supplied through leads 15 which are connected to generator 3 through a suitable dropping resistor 16 that reduces the voltage supplied to the cathode heater to the proper value. While a triode tube is shown, it is of course understood that tubes having a greater number of electrodes may be used.

When generator 3 is not operating, cathode 14 is held at the voltage existing at the positive terminal of battery 4 while grid 13 has placed on it a negative bias equal to that at the negative terminal of the battery, and cathode 14 is not heated. Under these conditions, no current passes through tube 9 and the spring 12 keeps the charging circuit open.

When generator 3 is running, the voltage at the positive terminal thereof is applied to anode 10, the cathode 14 is heated and is brought to the negative terminal voltage of the generator. The voltage on cathode 14 thus becomes progressively less positive with respect to grid 13 and current begins to pass through tube 9 and when this has become sufficiently great, the current through relay coil 11 attracts the member 7 and closes the charging circuit, which occurs when the generator voltage is greater than the battery voltage. When current flows in the charging circuit from generator to battery the potential difference set up by the flow of current through resistor 8 swings grid 13 positive with respect to cathode 14 so that the charging circuit is kept closed as long as the generator voltage is sufficient to send current through the battery 4. However, as soon as the voltage of generator 3 drops below that of battery 4 a reverse current begins to flow from the positive terminal of battery 4 through the generator and hence in the reverse direction through resistor 8, which makes cathode 14 positive with respect to grid 13 and reduces the current through tube 9 to a point that spring 12 breaks the charging circuit and so prevents discharge of battery 4 through generator 3. The tube 9 in Fig. 1 is of a type that operates with relatively low plate potential.

Figure 2:
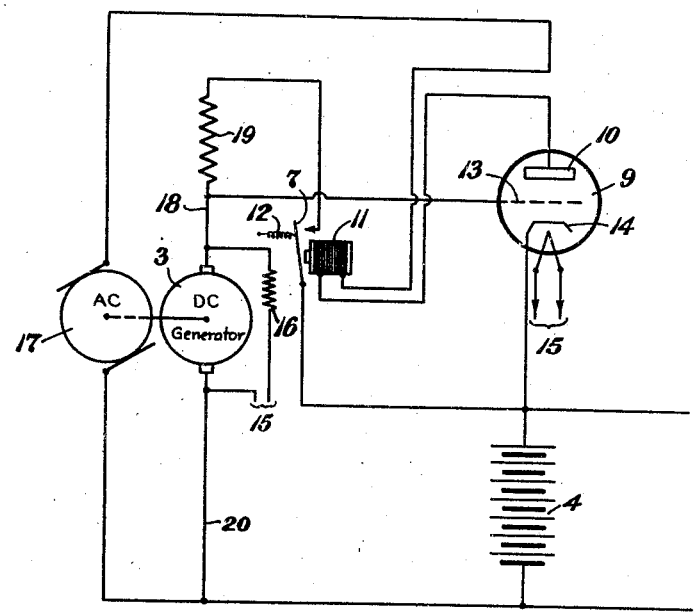
Fig. 2 depicts our invention in connection with a direct current generator driven by an alternating current motor that operates at a voltage higher than the output voltage of the generator.

The form of our invention shown in Fig. 2 utilizes a source of plate voltage greater than the output voltage of generator 3, which in the instance shown is the supply to an alternating current motor 17 connected to drive the generator 3, although it may be a separate direct current source. The charging circuit to the positive terminal of battery 4 comprises the positive lead 18, a resistor 19, the circuit breaking and closing member 7, while negative lead 20 connects the generator to the negative terminal of battery 4. One side of the supply to motor 17 is connected to anode 10 through relay coil 11 and the other side of the supply is connected to negative lead 20. Cathode 14 is connected to the positive terminal of battery 4 and grid 13 is connected to a point between resistor 19 and the positive terminal of generator 3. The connection for heating cathode 14 is above described. When an alternating voltage is applied to the anode relay coil 11 is of the delayed release type so that it does not permit the member 7 to be moved to open the circuit each time that the supply terminal connected to anode 10 becomes negative.

It is apparent that the voltage at the negative terminal of battery 4 is impressed upon grid 13 through generator 3 and that cathode 14 is held at a positive battery potential when the generator is not operating. When the generator 3 is started, the cathode 14 is heated and the voltage at the positive terminal of generator 3 is impressed upon grid 13 so that current begins to pass through tube 9. When this current has become sufficiently great to energize coil 11 and move member 7 to the circuit closing position the flow of current to battery 4 through resistor 19 makes grid 13 positive with respect to cathode 14, due to the drop across the resistor and thus the charging circuit is held closed. However, as soon as the voltage of generator 3 becomes less than the battery voltage a reverse current begins to flow which produces a potential drop across resistor 19 in the opposite direction, and swings grid 13 strongly negative with respect to cathode 14, thus blocking the tube and permitting spring 12 to move member 7 to the circuit breaking position.

The invention described herein may be manufactured and used by or for the Government of the United States of America for governmental purposes without the payment of any royalties thereon or therefor.

We claim:

1. A system to control the charging of a battery from a direct current generator, comprising a vacuum tube having an anode, a cathode, and a control grid, means connecting the positive terminal of the generator to the positive terminal of the battery, means continuously connecting the grid to the negative terminal of the battery, means including a resistor and a circuit breaking and closing member connected in series between the negative terminal of the battery and the cathode, said member being biased to open the circuit, a conductive connection between the negative terminal of the generator and the cathode, a connection between the positive terminal of the generator and the anode including a device energizable to actuate the member to and hold it in circuit closing position while the current through the tube is not less than that required to move said member to close the circuit, and current conductive means connected to the generator to heat the cathode.

2. A system to control the charging of a battery from a direct current generator, comprising a vacuum tube having an anode, a cathode and a control grid, means connecting the positive terminal of the generator to the positive terminal of the battery, means connecting the negative terminal of the generator to the cathode, means continuously connecting the grid to the negative terminal of the battery, a connection between the negative terminal of the battery and the cathode including a circuit breaking and closing member biased to open circuit and a resistance in series therewith to raise the potential of the grid with respect to the cathode when charging current flows from the generator to the battery and to make the grid negative with respect to the cathode to block the tube when current flows in the opposite direction, means connecting the anode to the positive terminal of the generator including a device energizable by current through the tube to actuate the member to and hold it in circuit closing position while the current through the vacuum tube is not less than that required to move the member to circuit closing position, and means to heat the cathode.

3. A system to control the charging of a battery from a direct current generator, comprising a vacuum tube having an anode, a cathode, and a control grid, means connecting the positive terminal of the generator to the positive terminal of the battery and to the anode, the connection to the anode including a current responsive device, means connecting the negative terminal of the generator to the negative terminal of the battery including a circuit breaking and closing member biased to the open circuit position disposed to be moved to circuit closing position by said device when sufficient current flows through the tube and also including a resistance in series therewith, means continuously connecting the grid to the negative terminal of the battery, means connecting the cathode to the negative terminal of the generator, and means to heat the cathode.

MILTON A. KNIGHT.
JOHN A. TAYLOR.

REFERENCES CITED

The following references are of record in the file of this patent:

UNITED STATES PATENTS

| Number | Name | Date |
|---|---|---|
| 374,673 | Griscom | Dec. 13, 1887 |
| 1,348,098 | Eiseman | July 27, 1920 |
| 1,437,361 | Rickets | Nov. 28, 1922 |
| 1,500,034 | Powell | July 1, 1924 |
| 1,563,327 | Brackett | Dec. 1, 1925 |
| 1,627,815 | Weibler | May 10, 1927 |
| 1,841,765 | Stansbury et al. | Jan. 19, 1932 |
| 1,854,965 | Traver | Apr. 19, 1932 |
| 1,872,560 | Breisky | Aug. 16, 1932 |
| 1,926,708 | Amsden | Sept. 12, 1933 |
| 1,947,289 | Evans | Feb. 13, 1934 |